(12) United States Patent
Cronin

(10) Patent No.: US 10,528,919 B2
(45) Date of Patent: *Jan. 7, 2020

(54) METHODS AND APPARATUS FOR DYNAMICALLY PROCESSING EVENTS BASED ON AUTOMATIC DETECTION OF TIME CONFLICTS

(71) Applicant: Intel Corporation, Santa Clara, CA (US)

(72) Inventor: Thomas M. Cronin, Hillboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/981,502

(22) Filed: Dec. 28, 2015

(65) Prior Publication Data

US 2016/0117614 A1 Apr. 28, 2016

Related U.S. Application Data

(63) Continuation of application No. 14/538,474, filed on Nov. 11, 2014, which is a continuation of application
(Continued)

(51) Int. Cl.
*G06F 7/00* (2006.01)
*G06Q 10/10* (2012.01)
(Continued)

(52) U.S. Cl.
CPC ....... *G06Q 10/1095* (2013.01); *G06F 16/955* (2019.01); *G06Q 10/02* (2013.01);
(Continued)

(58) Field of Classification Search
CPC .................................................... G06F 9/466
(Continued)

(56) References Cited

U.S. PATENT DOCUMENTS 5,139,100 A * 8/1992 Brauneis ............... A47F 9/048
177/245
5,174,399 A 12/1992 Brauneis
(Continued)

OTHER PUBLICATIONS

Hirt et al., "IrDA Serial Infrared Physical Layer Link Specification for 16 Mb/s Addition (VFIR)," Infrared Data Association, Errata to IrPHY Version 1.3, Jan. 8, 1999 (21 pages).
(Continued)

*Primary Examiner* — Eliyah S. Harper
(74) *Attorney, Agent, or Firm* — Hanley, Flight & Zimmerman, LLC

(57) ABSTRACT

Methods and apparatus for dynamically processing events based on automatic detection of time conflicts are disclosed. An example method includes accessing first time and date information from a user schedule, the user schedule including a scheduled item represented by the first time and date information; identifying second time and date information associated with a first event associated with a desired transaction; determining that the first event conflicts with the scheduled item by comparing the second time and date information with the first time and date information; identifying third time and date information associated with an alternate event in association with the desired transaction; determining that the alternate event does not conflict with the scheduled item by comparing the third time and date information with the first time and date information; and facilitating completion of the transaction based on the alternate event and the third time and date information.

18 Claims, 2 Drawing Sheets

Related U.S. Application Data

No. 12/384,903, filed on Apr. 10, 2009, now Pat. No. 9,082,111, which is a continuation of application No. 10/000,904, filed on Nov. 15, 2001, now abandoned.

(51) Int. Cl.

| | | |
|---|---|---|
| *G06F 16/955* | (2019.01) | |
| *G06Q 10/02* | (2012.01) | |
| *G06Q 20/20* | (2012.01) | |
| *G06Q 30/06* | (2012.01) | |
| *G06F 9/46* | (2006.01) | |

(52) U.S. Cl.
CPC ......... *G06Q 10/109* (2013.01); *G06Q 20/202* (2013.01); *G06Q 30/0635* (2013.01); *G06F 9/466* (2013.01)

(58) Field of Classification Search
USPC .......................................................... 707/615
See application file for complete search history.

(56) References Cited

U.S. PATENT DOCUMENTS

| | | | |
|---|---|---|---|
| 5,383,112 A | 1/1995 | Clark | |
| 5,475,585 A | 12/1995 | Bush | |
| 5,504,899 A | 4/1996 | Raz | |
| 5,570,283 A | 10/1996 | Shoolery et al. | |
| 5,666,553 A | 9/1997 | Crozier | |
| 5,764,155 A * | 6/1998 | Kertesz | H02J 13/0086 340/3.21 |
| 5,790,974 A * | 8/1998 | Tognazzini | G01C 21/343 340/988 |
| 6,047,260 A | 4/2000 | Levinson | |
| 6,076,078 A * | 6/2000 | Camp | G06Q 20/045 380/268 |
| 6,092,629 A * | 7/2000 | Bohnert | G07F 5/18 186/53 |
| 6,424,949 B1 * | 7/2002 | Deaton | G06Q 20/387 705/14.25 |
| 6,510,998 B1 * | 1/2003 | Stanford | G06Q 20/02 235/380 |
| 6,567,533 B1 | 5/2003 | Rhoads | |
| 6,567,807 B1 | 5/2003 | Robles et al. | |
| 6,574,630 B1 | 6/2003 | Augustine et al. | |
| 6,651,253 B2 | 11/2003 | Dudkiewicz et al. | |
| 6,704,713 B1 | 3/2004 | Brett | |
| 6,873,994 B2 | 3/2005 | Kootale | |
| 6,938,103 B2 * | 8/2005 | Azzarito | G06F 13/385 710/305 |
| 6,988,079 B1 | 1/2006 | Or-Bach et al. | |
| 7,222,104 B2 | 5/2007 | Tadayon et al. | |
| 7,249,050 B1 * | 7/2007 | Walker | G06Q 20/20 700/231 |
| 7,289,964 B1 * | 10/2007 | Bowman-Amuah | G06F 9/5038 705/1.1 |
| 9,082,111 B2 | 7/2015 | Cronin | |
| 2001/0016051 A1 | 8/2001 | Rhoads | |
| 2001/0037465 A1 | 11/2001 | Hart, III et al. | |
| 2001/0049690 A1 | 12/2001 | McConnell et al. | |
| 2002/0007362 A1 * | 1/2002 | Collins | G06Q 10/10 |
| 2002/0016729 A1 | 2/2002 | Breitenbach et al. | |
| 2002/0016816 A1 | 2/2002 | Rhoads | |
| 2002/0026426 A1 | 2/2002 | Bennett | |
| 2002/0107755 A1 * | 8/2002 | Steed | G06F 17/243 705/26.1 |
| 2003/0040957 A1 | 2/2003 | Rodriguez et al. | |
| 2003/0078777 A1 | 4/2003 | Shiau | |
| 2003/0093706 A1 | 5/2003 | Cronin | |
| 2009/0276780 A1 | 11/2009 | Cronin | |
| 2015/0066547 A1 | 3/2015 | Cronin | |
| 2016/0132836 A1 | 5/2016 | Cronin | |

OTHER PUBLICATIONS

Seaborne et al., "Infrared Data Association Link Management Protocol," Infrared Data Association, Version 1.1, Jan. 23, 1996 (98 pages).

Suvak, "IrDA Serial Infrared Link Access Protocol Specification for 16 Mb/s Addition (VFIR)," Infrared Data Association, Errata to IrLAP Version 1.1, Jan. 5, 1999 (6 pages).

Tan et al., "Infrared Data Association Serial Infrared Physical Layer Specification," Infrared Data Association, Version 1.4, May 30, 2001 (68 pages).

United States Patent and Trademark Office, "Examiner's Answer to Appeal Brief," issued in connection with U.S. Appl. No. 10/000,904, dated Sep. 17, 2007 (18 pages).

United States Patent and Trademark Office, "Examiner's Answer to Appeal Brief," issued in connection with U.S. Appl. No. 10/000,904, dated Jul. 15, 2009 (18 pages).

United States Patent and Trademark Office, "Final Office Action," issued in connection with U.S. Appl. No. 10/000,904, dated Nov. 3, 2004 (17 pages).

United States Patent and Trademark Office, "Final Office Action," issued in connection with U.S. Appl. No. 10/000,904, dated Nov. 14, 2005 (19 pages).

United States Patent and Trademark Office, "Non-Final Office Action," issued in connection with U.S. Appl. No. 10/000,904, dated Mar. 16, 2004 (13 pages).

United States Patent and Trademark Office, "Non-Final Office Action," issued in connection with U.S. Appl. No. 10/000,904, dated May 17, 2005 (17 pages).

United States Patent and Trademark Office, "Patent Board Decision," issued in connection with U.S. Appl. No. 10/000,904, dated Jun. 28, 2013 (8 pages).

United States Patent and Trademark Office, "Notice of Allowance," issued in connection with U.S. Appl. No. 12/384,903 dated Mar. 19, 2015 (8 pages).

United States Patent and Trademark Office, "Advisory Action," issued in connection with U.S. Appl. No. 12/384,903 dated Feb. 12, 2014 (3 pages).

United States Patent and Trademark Office, "Non-Final Office Action," issued in connection with U.S. Appl. No. 12/384,903 dated Sep. 15, 2010 (9 pages).

United States Patent and Trademark Office, "Non-Final Office Action," issued in connection with U.S. Appl. No. 12/384,903 dated Sep. 2, 2014 (8 pages).

United States Patent and Trademark Office, "Non-Final Office Action," issued in connection with U.S. Appl. No. 12/384,903 dated Mar. 13, 2014 (8 pages).

United States Patent and Trademark Office, "Non-Final Office Action," issued in connection with U.S. Appl. No. 12/384,903 dated May 23, 2013 (9 pages).

United States Patent and Trademark Office, "Non-Final Office Action," issued in connection with U.S. Appl. No. 12/384,903 dated Nov. 7, 2012 (14 pages).

United States Patent and Trademark Office, "Non-Final Office Action," issued in connection with U.S. Appl. No. 12/384,903 dated May 16, 2012 (12 pages).

United States Patent and Trademark Office, "Final Office Action," issued in connection with U.S. Appl. No. 12/384,903 dated Jan. 15, 2015 (12 pages).

United States Patent and Trademark Office, "Final Office Action," issued in connection with U.S. Appl. No. 12/384,903 dated Nov. 7, 2013 (9 pages).

United States Patent and Trademark Office, "Final Office Action," issued in connection with U.S. Appl. No. 12/384,903 dated Mar. 3, 2011 (14 pages).

United States Patent and Trademark Office, "Non-Final Office Action," issued in connection with U.S. Appl. No. 14/538,474, dated Jun. 19, 2015 (11 pages).

Williams et al., "Infrared Data Association 'Tiny TP': A Flow-Control Mechanism for use with IrLMP," Infrared Data Association, Version 1.1, Oct. 20, 1996 (23 pages).

(56) References Cited

OTHER PUBLICATIONS

Williams et al., "Infrared Data Association Serial Infrared Link Access Protocol (IrLap)," Infrared Data Association, Version 1.1, Jun. 16, 1996 (119 pages).

United States Patent and Trademark Office, "Non-Final Office Action", issued in connection with U.S. Appl. No. 14/981,516, dated Nov. 2, 2017 (27 pages).

United States Patent and Trademark Office, "Final Office Action," issued in connection with U.S. Appl. No. 14/538,474, dated May 17, 2017 (18 pages).

United States Patent and Trademark Office, "Non-Final Office Action," issued in connection with U.S. Appl. No. 14/538,474, dated Nov. 4, 2016 (15 pages).

United States Patent and Trademark Office, "Final Office Action," issued in connection with U.S. Appl. No. 14/538,474, dated May 5, 2016 (15 pages).

United States Patent and Trademark Office, "Final Office Action," issued in connection with U.S. Appl. No. 14/981,516, dated Jun. 14, 2018, 20 pages.

United States Patent and Trademark Office, "Non-Final Office Action," issued in connection with U.S. Appl. No. 14/981,516, dated Apr. 20, 2017 (18 pages).

United States Patent and Trademark Office, "Notice of Allowance and Fee(s) Due," issued in connection with U.S. Appl. No. 14/981,516, dated Sep. 10, 2019, 32 pages.

\* cited by examiner

METHODS AND APPARATUS FOR DYNAMICALLY PROCESSING EVENTS BASED ON AUTOMATIC DETECTION OF TIME CONFLICTS

RELATED APPLICATIONS

This application is a continuation of U.S. patent application Ser. No. 14/538,474, filed on Nov. 11, 2014, entitled "Method and Apparatus for Dynamically Processing Events Based on Automatic Detection of Time Conflicts," which is a continuation of U.S. patent application Ser. No. 12/384,903, filed on Apr. 10, 2009 (now U.S. Pat. No. 9,082,111), which is a continuation of U.S. patent application Ser. No. 10/000,904, filed Nov. 15, 2001, entitled "Method and Apparatus for Dynamically Adjusting Electronic Schedules Based on Automatic Detection of Time Conflicts." U.S. patent application Ser. Nos. 14/538,474, 12/384,903, and 10/000,904 are incorporated herein by reference in their entireties.

FIELD OF THE INVENTION

The present invention relates generally to apparatus and methods used for scheduling. More particularly, the present invention relates to the use of purchased goods to trigger adjustments to electronic schedules.

BACKGROUND INFORMATION

Individual electronic schedules have become as common as the existence of personal computers. Most desktop computers include some type of personal scheduling software package, as do the increasingly popular palm-top generation of computers. However, the included scheduling packages are typically quite primitive, merely used to record whatever is placed into them by the hand of the user. More advanced scheduling packages offer the ability to cross-schedule between networked users, detecting conflicts and locating personnel based on shared information.

Given the current state of scheduling software, consumers attempting to schedule their time in conjunction with the purchase of theatre tickets, for example, must consult personal planners, or palm-top computers to verify the existence of available dates and times. Open schedule periods are manually compared with potential event dates. Errors, such as mistaking one month for the next, or one date for another, often occur, due to the exigency of the purchase. Finally, consumers may simply fail to enter information associated with the purchase which may be needed at a later time. Such forgotten items may include seat reservation information, a map of the facility, or a directory of on-site services.

Therefore, there is a need in the art for an apparatus, an article including a machine-accessible medium, a system, and a method of adjusting a schedule based on the purchase of goods or services associated with such a purchase. The ability to automatically adjust or modify a schedule based on a timed event should be provided to reduce the possibility of human error. Further, revisions of the purchase should be allowed to accommodate schedule conflicts, along with the option of conveying additional related information to the consumer which may be useful at the time of the event (e.g., travel information).

DESCRIPTION OF THE PREFERRED EMBODIMENTS

Figure 1:
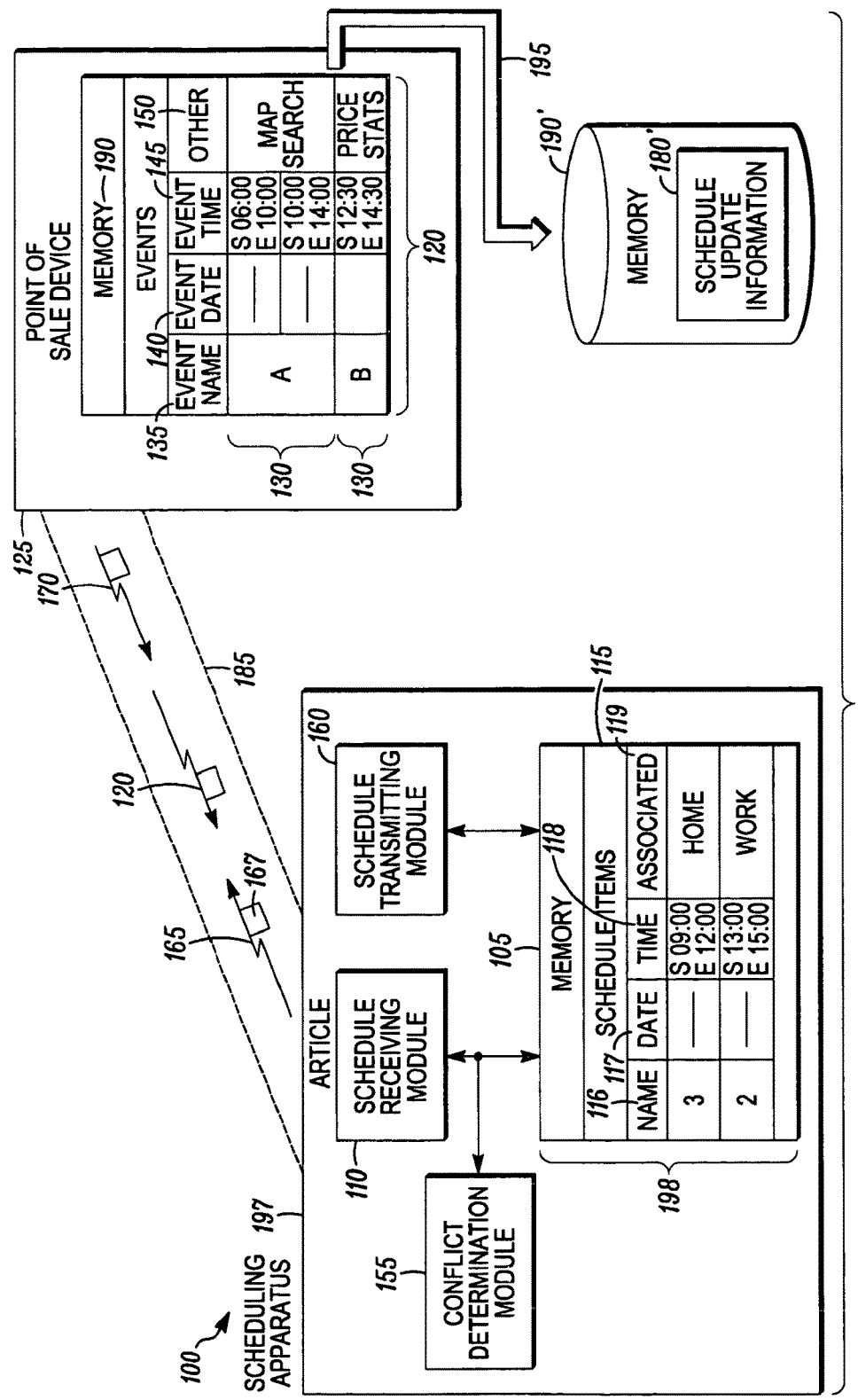
FIG. 1 is a block diagram of an apparatus, an article including a machine-accessible medium, and a system according to various embodiments of the present invention.

In the following detailed description of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the invention. Other embodiments may be utilized and derived therefrom, such that structural and logical substitutions and changes may be made without departing from the scope of the invention. The following detailed description, therefore, is not to be taken in a limiting sense, and the scope of the invention is defined only by the appended claims, along with the full range of equivalents to which such claims are entitled.

FIG. 1 is a block diagram of an apparatus, an article including a machine-accessible medium, and a system according to various embodiments of the present invention. In one embodiment of the invention, the scheduling apparatus 100 may include a memory 105 capable of being communicatively coupled with a schedule receiving module 110. The memory may be used to store a plurality of schedule items 115, each of which may be associated with a name 116, date 117, and an item time 118, which may further include an item start time and an item end time. For example, item "Y" may be associated with the item name "BREAKFAST", a date of Jun. 1, 2001, a start time of 0900, and an end time of 1200. Of course, those skilled in the art will realize that the date(s) 117 and times 118 during which a particular schedule item occurs may be incorporated into a single item "time" 118 (e.g. a "time" of 0001 may be a coded time which means an item is scheduled to occur on Jan. 1, 2001, from 0800 to 1000), into both start and end times (e.g. a "start time" of 0001 may be a coded time which means the scheduled item starts on Jan. 1, 2001 at 0800, and an "end time" may be a coded time which means the scheduled item ends on Jan. 1, 2001 at 1000), or kept separately from timing information, as shown herein. The schedule items 115 stored in the memory 105 may also include other associated elements 119, such as item location/mapping information, seating availability and parking information, the location and cost of nearby services (e.g., beverage sales, or restaurants), house rules (no flash photography, cell phones turned off), musician's web site address, advertising and marketing (e.g., Purchase a CD of tonight's performance by calling 123-4567.), etc.

The schedule receiving module 110 is capable of automatically receiving schedule update information 120, perhaps as transmitted by an information repository, such as a vendor's server or point of sale (POS) device 125. Of course, the update information 120 may also as entered by a user of the apparatus 100, perhaps with a keypad, microphone, stylus, or other data entry device. The update information 120 is typically associated with a purchase transaction and at least one event 130, and may include an event name 135 (e.g., event A may be named "CIRCUS"), an event date 140 (e.g., for event A the date may be "Jun. 1, 2001"), and an event time 145, which may include an event start time (e.g., for event A the start time may be "1400") and an event end time (e.g., for event A the end time may be "1600"). Of course, the event time 145 may include coded date and/or start/end timing information, as noted above with respect to schedule items 115. Other informative 150, similar to or identical to any or all of the associated elements 119 described with respect to schedule items 115, may be associated with the event and included in the update information 120.

The scheduling apparatus 100 may also include a conflict determination module 155 capable of being coupled to the memory 115. The conflict determination module 155 is capable of determining the existence of a schedule conflict between an event time (e.g., the start and end times 145 of an event 135 transmitted to the apparatus 100 in the schedule update information 120) and scheduled item times (e.g., the date, start and end times of items 115 previously stored in the memory 105).

The apparatus 100 may also include a schedule transmission module 160 capable of being coupled to the memory 105. The transmission module is capable of sending a message 165, including information regarding the existence of a schedule conflict 167, to the POS 125.

For example, assume that a user of the apparatus 100 attempts to purchase a ticket from a vendor of tickets to a nearby circus. The apparatus 100 may have schedule item 115 information regarding event "Y" stored in the memory 105 for a "BREAKFAST" on Jun. 1, 2001, starting at 0900 and ending at 1200 at a "HOME" location. If the user of the apparatus 100 wishes to attend the event "A", which is a "CIRCUS" occurring on the same day, from 0800 to 1000, a schedule conflict exists. If the event schedule update information 120 is sent to the apparatus 100, this conflict may be detected by the conflict determination module 155, and a message 165 including information about the conflict 167 may be sent from the apparatus 100 to the POS device 125.

In return, the conflict information message 165 may be received by the POS device 125, and another message, containing alternative schedule update information 170 associated with the event 130 (e.g., event "A") including an alternative event timing, such as an alternative event start time (e.g., 1400) and an alternative event end time (e.g., 1600). As noted above, the alternative event time information may include coded date and time information, or separate date/time start/end information.

In another embodiment of the invention, a scheduling system 175 may include a POS device 125 which has schedule update information 180 associated with various events 130 including event names 135, event dates 140 and/or times 145 (possibly including coded date and/or start/end times). The system 175 may also include a scheduling apparatus 100, which is capable of being communicatively coupled to the POS device 125, perhaps by making use of a medium 185, such as an electronic conductor, an optical conductor, an electromagnetic wave, or a combination of these. Any protocol may be used, including those specified in the Bluetooth™ (e.g., "Bluetooth System Specification," Bluetooth Special Interest Group, Ver. 1.1, March 2001) and Infra-red Data Association (IrDA) standards (e.g., the "Infrared Data Association Minimal IrDA Protocol Implementation," Counterpoint Systems Foundry, Inc., Ver. 1.0, Nov. 6, 1996). As previously described, the apparatus 100 may include a schedule receiving module 110 and a memory 105 (which may be used to store a plurality of schedule items 115, schedule update information 120, and/or the alternative schedule update information 170).

The POS device 125 may include a memory 190 for storing the event information 180, or the event information 180' may be stored in an information repository, such as a memory 190' separate and apart from the POS device 125. For example, the memory 190' may be co-located with an event sponsor. The memory 190, 190' may be dedicated to the device 125, or merely capable of being communicatively coupled with it, such as by using a medium 195 (similar to or identical to the medium 185).

The information 180 may be stored in any number of ways, well known to those skilled in the art, such as by storing the information 180 so that each event 130 has other data elements 140, 145, and 150 associated with the event name 135. Other information 150, such as location/mapping information (e.g., a map of the event location), pricing information for the event or local services, and/or seating information, etc. may also be associated with the event name 135 and stored in the memory 190, 190'.

It should be noted that the memories 105, 190, 190'; the schedule receiving module 110; the conflict determination module 155; and the schedule transmission module 160 may all be characterized as "modules" herein. Such modules may include hardware circuitry, such as a microprocessor and/or memory circuits, software program modules, and/or firmware, and combinations thereof, as desired by the architect of the apparatus 100 and system 175, and appropriate for particular implementations of the invention.

One of ordinary skill in the art will understand that the scheduling apparatus and system of the present invention can be used in applications other than for apparatus such as handheld computers, and systems which include networked servers or POS devices, and thus, the invention is not to be so limited. The illustrations of a scheduling apparatus 100 and a scheduling system 175 are intended to provide a general understanding of the structure of the present invention, and are not intended to serve as a complete description of all the elements and features of scheduling apparatus and systems which might make use of the structures described herein.

Applications which may include the novel scheduling apparatus and system of the present invention include electronic circuitry used in high-speed computers, communication and signal processing circuitry, modems, processor modules, embedded processors, and application-specific modules, including multilayer, multi-chip modules. Such scheduling apparatus and system may further be included as sub-components within a variety of electronic systems, such as televisions, cellular telephones, personal computers, radios, vehicles, and others.

Figure 2:
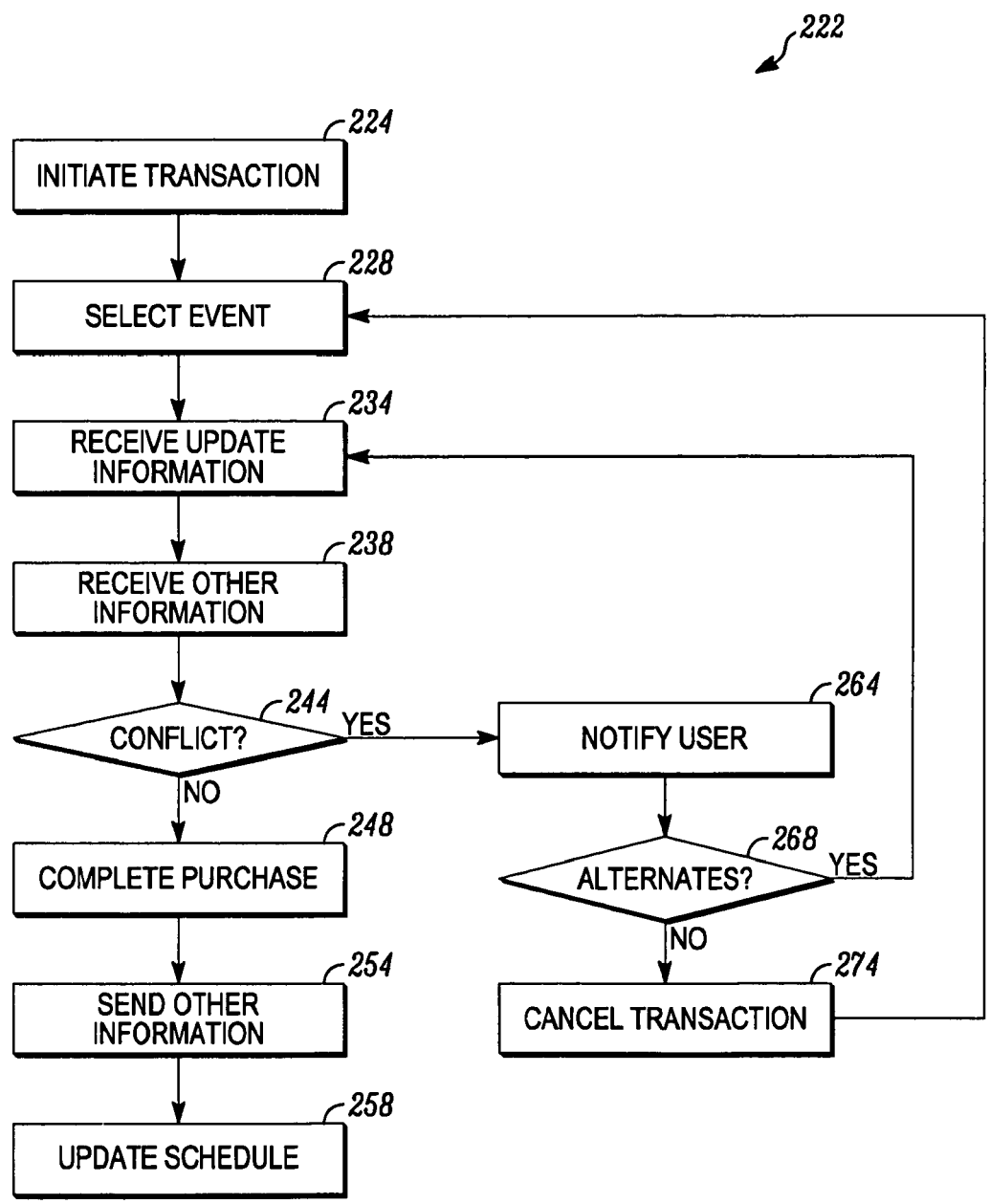
FIG. 2 is flow chart illustrating a method of adjusting a schedule according to an embodiment of the present invention.

FIG. 2 is a flow chart illustrating a method of adjusting a schedule according to an embodiment of the present invention. The method 222 may include initiating a purchase transaction, such as attempting to buy tickets for an event at block 224. The method 222 may continue with selecting an event associated with the purchase transaction at block 228. The selected event is typically associated with schedule update information, such as the event name and time, which may further include an event date, an event start time, and an event end time.

The method 222 may then proceed with receiving the schedule update information at block 234, and possibly, other associated information at block 238. For example, if the event is a basketball game, the associated information may include seating and parking information. Thus, if there is a relatively small amount of associated information, it may be downloaded to the user along with the event time data as part of the update information. The associated information may also be downloaded later, after there is more assurance that the purchase transaction will ultimately be completed.

The method 222 may then continue with determining whether a schedule conflict exists between the event time (e.g., the event start and end times for the selected event) and the item time (e.g., the item start and end times) associated with a schedule item which already exists in the user schedule at block 244. If no conflict exists, then the purchase transaction may be completed at block 248, and other information associated with the event may be received at block 254 (e.g. the information discussed with respect to block 238 and/or more lengthy transmissions, such as images of the event or sound clips of performers at the event, etc.). Of course, non-time related information (e.g. a map, pricing, and/or seating information associated with the event name) may also be received at blocks 238 and 254, according to the desires of those implementing the method 222 of the invention. The method 222 may conclude with adjusting the schedule to include the schedule update information if a schedule conflict is determined not to exist at block 258.

If a schedule conflict is detected at block 244, the scheduled party (or a user of the apparatus, such as apparatus 100 shown in FIG. 1) may be notified at block 264, using visual messaging, lighting, and/or audio mechanisms, such as displays, LEDs, speakers, or other transducers. Conflicts may be determined due to a direct event time conflict, as discussed above, or by analyzing other scheduled items, including their location and nature, to determine whether travel time from a scheduled item to a selected event result in a conflict.

For example, if a doctor's appointment exists as a scheduled item, and it is known that such appointments are regularly delayed an hour or more beyond the scheduled start time, such delays may be taken into consideration, and an "indirect" conflict may be determined at block 244. Thus, if an event is scheduled less than 90 minutes after the end of the scheduled doctor's appointment a conflict may be generated to account for appointment fulfillment delays, and travel time to the event, given the location of the doctor's office and the event, derived from associated elements and information stored in the memories described above. Thus, more advanced versions of the invention may be able to consider time and distance information between scheduled events, blocking out travel time and alerting consumers to possible conflicts based on the proximity (time and distance) of separate events and schedule items.

If a conflict exists, a determination can then be made at block 268 as to whether alternative events may be substituted for the selected event. If so, then alternative event time information, include alternative event start and end times, may be received at block 234. If no alternatives exist, as determined at block 268, then the transaction may be canceled at block 274, and the method 222 may include refraining from adjusting the schedule to include the schedule update information. At this time the method 222 may conclude, or may continue with selecting another event associated with a purchase transaction at block 228.

Thus, referring back to FIG. 1, it is now easily understood that another embodiment of the invention may include an article 197, such as a computer, a memory system, a magnetic or optical disk, some other storage device, and/or any type of electronic device or system, comprising a machine-accessible medium 105 (e.g., a memory including an electrical, optical, or electromagnetic conductor) having associated data 198 (e.g. computer program instructions), which when accessed, results in a machine performing such actions as selecting an event associated with a purchase transaction and schedule update information (including an event name, an event start time, and an event end time); receiving the schedule update information; determining whether a schedule conflict exists between the event time and item time (associated with a schedule item); and adjusting the schedule to include the schedule update information if a schedule conflict does not exist.

The actions may further include refraining from adjusting the schedule to include the schedule update information if a schedule conflict exists, notifying the user of the schedule conflict, and canceling the purchase transaction.

The apparatus, system, article, and method of the invention provide an efficient mechanism whereby the user of a personal digital assistant (PDA) or other handheld computer, for example, may automatically update schedule information to include useful event information in conjunction with a purchase transaction, such as buying airline tickets. Use of the invention provides an opportunity to reduce the possibility of human error with regard to schedule conflicts, and accommodates alternatives to avoid such conflicts. The invention also provides the option of automatically conveying additional related information to the consumer which may be useful at the time of the event (e.g., travel information). Some versions of the invention may also consider time and distance information between scheduled events, blocking out travel time and alerting consumers to conflicts based on the proximity (time and distance) of separate events.

Although specific embodiments have been illustrated and described herein, those of ordinary skill in the art will appreciate that any arrangement which is calculated to achieve the same purpose may be substituted for the specific embodiment shown. This disclosure is intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of the invention includes any other applications in which the above structures and methods are used. The scope of the invention should be determined with reference to the appended claims, along with the full range of equivalents to which such claims are entitled.

What is claimed is:

1. A tangible computer readable storage device comprising computer readable instructions which, when executed, cause at least one processor of a first server to at least:
   transmit, from the first server over a communication network to a second server, a first request to access first time and date information of an electronic user schedule from the second server, the electronic user schedule including a scheduled item represented by the first time and date information;
   initiate a purchase transaction for at least one of a good or a service associated with a first event by transmitting, from the first server over the communication network to a third server, a second request to access second time and date information associated with the first event from the third server, the purchase transaction based on a user selection;

based on a first network communication transmitted from the third server over the communication network to the first server in response to the second request, determine that the first event conflicts with the scheduled item by comparing the second time and date information with the first time and date information;

identify third time and date information associated with an alternate event in association with the purchase transaction;

determine that the alternate event does not conflict with the scheduled item by comparing the third time and date information with the first time and date information;

initiate completion of a revised purchase transaction by transmitting a second network communication over the communication network when the alternate event does not conflict with the scheduled item, the revised purchase transaction being for at least one of a good or a service associated with the alternate event; and in response to a third network communication confirming completion of the revised purchase transaction, transmit, from the first server over the communication network to the second server, a third request to adjust the electronic user schedule to include the third time and date information.

2. The tangible computer readable storage device as defined in claim 1, wherein the instructions are further to cause the at least one processor to generate a notification by at least one of visual messaging, lighting, or an audio mechanism.

3. The tangible computer readable storage device as defined in claim 1, wherein the instructions are further to cause the at least one processor to transmit a fourth request to access the third time and date information from at least one of the third server or a point of sale device.

4. The tangible computer readable storage device as defined in claim 1, wherein the instructions are further to cause the processor to convey travel information based on the alternate event.

5. A scheduling apparatus, comprising:
at least one processor of a first server; and
a memory in communication with the at least one processor, the memory including computer readable instructions which, when executed, cause the at least one processor to at least:
transmit, from the first server over a communication network to a second server, a first request to access first time and date information of an electronic user schedule from the second server, the electronic user schedule including a scheduled item represented by the first time and date information;
initiate a purchase transaction for at least one of a good or a service associated with a first event by transmitting, from the first server over the communication network to a third server, a second request to access second time and date information associated with the first event from the third server, the purchase transaction based on a user selection;
based on a first network communication transmitted from the third server over the communication network to the first server in response to the second request, determine that the first event conflicts with the scheduled item by comparing the second time and date information with the first time and date information;

identify third time and date information associated with an alternate event in association with the purchase transaction;

determine that the alternate event does not conflict with the scheduled item by comparing the third time and date information with the first time and date information;

initiate completion of a revised purchase transaction by transmitting a second network communication over the communication network when the alternate event does not conflict with the scheduled item, the revised purchase transaction being for at least one of a good or a service associated with the alternate event; and in response to a third network communication confirming completion of the revised purchase transaction, transmit, from the first server over the communication network to the second server, a third request to adjust the electronic user schedule to include the third time and date information.

6. The scheduling apparatus as defined in claim 5, wherein the instructions are further to cause the at least one processor to generate a notification by at least one of visual messaging, lighting, or an audio mechanism.

7. The scheduling apparatus as defined in claim 5, wherein the instructions are further to cause the at least one processor to transmit a fourth request to access the third time and date information from at least one of the third server or a point of sale device.

8. The scheduling apparatus as defined in claim 5, wherein the instructions are further to cause the at least one processor to convey travel information based on the alternate event.

9. A method, comprising:
transmitting, from a first server over a communication network to a second server, by executing an instruction with at least one processor of the first server, a first request to access first time and date information of an electronic user schedule from the second server, the electronic user schedule including a scheduled item represented by the first time and date information;
initiating a purchase transaction for at least one of a good or a service associated with a first event by transmitting, from the first server over the communication network to a third server, a second request to access second time and date information from the third server, the purchase transaction based on a user selection;
based on a first network communication transmitted from the third server over the communication network to the first server in response to the second request, determining, by executing an instruction with the at least one processor, that the first event conflicts with the scheduled item by comparing, with the at least one processor, the second time and date information with the first time and date information;
identifying, by executing an instruction with the at least one processor, third time and date information associated with an alternate event in association with the purchase transaction;
determining, by executing an instruction with the at least one processor, that the alternate event does not conflict with the scheduled item by comparing, with the at least one processor, the third time and date information with the first time and date information;
initiating completion of, by executing an instruction with the at least one processor, a revised purchase transaction by transmitting a second network communication over the communication network when the alternate event does not conflict with the scheduled item, the revised purchase transaction being for at least one of a good or a service associated with the alternate event; and in response to a third network communication confirming completion of the revised purchase transaction, transmitting, from the first server over the communication network to the second server, a third request, by executing an instruction with the at least one processor, to adjust the electronic user schedule to include the third time and date information.

10. The method as defined in claim 9, further including generating a notification by at least one of visual messaging, lighting, or an audio mechanism.

11. The method as defined in claim 9, further including receiving the third time and date information from at least one of the third server or a point of sale device.

12. The method as defined in claim 9, further including conveying travel information based on the alternate event.

13. The tangible computer readable storage device as defined in claim 1, wherein the instructions cause the at least one processor to obtain non-time related information corresponding to the first event including at least one of a map, parking information, pricing information, or seating information.

14. The tangible computer readable storage device as defined in claim 4, wherein the instructions cause the at least one processor to determine an indirect conflict of the alternate event based on the travel information.

15. The scheduling apparatus as defined in claim 5, wherein the instructions are further to cause the at least one processor to obtain non-time related information corresponding to the first event including at least one of a map, parking information, pricing information, or seating information.

16. The scheduling apparatus as defined in claim 8, wherein the instructions are further to cause the at least one processor to determine an indirect conflict of the alternate event based on the travel information.

17. The method as defined in claim 9, further including obtaining non-time related information corresponding to the first event, the non-time related information including at least one of a map, parking information, pricing information, or seating information.

18. The method as defined in claim 12, further including determining an indirect conflict of the alternate event based on the travel information.

* * * * *